United States Patent Office 3,297,468
Patented Jan. 10, 1967

3,297,468
TREATMENT OF POLYETHYLENE TEREPHTHALATE FILAMENTS FOR IMPROVED RUBBER ADHESION
Karl Macura, Klingenberg am Main, Franz Josef Schmitz, Erlenbach am Main, and Erhard Siggel, Seckmauern uber Hochst im Odenwald, Germany, assignors to Vereinigte Glanzstoff-Fabriken AG., Wuppertal-Elberfeld, Germany
No Drawing. Filed Nov. 10, 1964, Ser. No. 410,266
Claims priority, application Germany, Nov. 20, 1963, V 24,905
3 Claims. (Cl. 117—47)

For some time, filaments of synthetic high molecular weight polymers have been used as tire cord in the manufacture of rubber tires or as reinforcing cords incorporated in friction belts or the like. For use as tire cord, synthetic polymers are particularly suitable because of their properties of high tensile strength and the possibility of adjusting their elasticity to almost any required value during the production of the initial spun and stretched filaments. On the other hand, there have always been serious problems in the installation of the cord in rubber tires due to the fact that the filaments or cords of synthetic polymers have very poor rubber adhesion properties.

Rubber adhesion difficulties have been practically overcome in the case of polyamide filaments, e.g. nylon cord. Before being encased or molded into the rubber, the nylon cord fabric is treated with an aqueous dispersion of an agent which acts to improve the rubber adhesion. An aqueous dispersion containing a combination of a resorcinol-formaldehyde precondensate and a vinyl pyridine latex is best known as an effective treating agent for improving the rubber adhesion of nylon cord, the resorcinol-formaldehyde-latex composition usually being referred to by the abbreviation "RFL."

Polyethylene terephthalate as a tire cord also has a number of advantages and offers an even further improvement over nylon. For example, this synthetic polyester has a steeper stress-strain diagram and, correspondingly, greater resistance to "growing," i.e. the tendency to permanently expand or become elastically deformed under relatively long periods of strain and high temperatures as occur in tires is reduced when useing such polyester filaments. However, the rubber adhesion of polyethylene terephthalate cord is even worse than that of nylon cord. Furthermore, the agents employed for improving the rubber adhesion of nylon do not provide a similar satisfactory result when applied directly to polyethylene terephthalate. Therefore, attempts have been made to find entirely new treating agents for improving the rubber adhesion of polyethylene terephthalate, or else preliminary treatments of the polyester have been used in combination with the known resorcinol-formaldehyde-latex bonding agents.

For example, one process is known wherein a polyisocyanate, preferably triphenyl methane tri-isocyanate, is applied to the polyester yarn or fabric to be used as the tire cord. This polyisocyanate may also be applied as a mixture with rubber solutions. However, such compounds must be used as solutions in organic solvents. Aside from the fact that such solvents make the process relatively expensive, the explosion hazards and toxicity of these materials are very undesirable features in any commercial application. Also, the isocyanates are extremely sensitive to moisture and therefore have a relative short life which makes them quite difficult to use in an effective manner.

When using the above mentioned RFL compositions known for improving the rubber adhesion of nylon, it is necessary to employ at least two baths, i.e. two different treating agents are employed in two separate process stages. The polyethylene terephthalate cord is first subjected to a preliminary treatment with a complex aqueous dispersion containing a combination of various compounds which serves to provide a coated or pretreated filament to which the known resorcinol-formaldehyde-latex bonding agent can be applied in a second step. In one of these known two-stage treating methods, the first stage aqueous dispersion contains nine different compounds, including polyvinyl chloride and a polyamide as essential components. Another two-stage process is known in which the first stage requires treatment with a mixture of ten different components and the second stage requires seven different compounds. This large number of components in the various baths obviously complicates the entire process and makes it quite expensive, because each component or chemical compound must be present in a precisely determined and definite concentration. If the treating baths are not prepared very carefully and conscientiously, the results are apt to be quite poor and lacking in any uniformity, and on the other hand, the cost of such precise quality control may be prohibitive.

In addition to the above mentioned disadvantages of the known two-stage processes, the preliminary treating agents employed with polyethylene terephthalate cause a hardening or stiffening of the cord fabric. This effect may be caused by the preliminary treating agent itself and/or by the necessity of subjecting the pretreated cord to extremely high temperatures so as to fix the agent onto the cord. In any case, it is impossible to carry out the preliminary treatment of the polyester fibers at a point prior to actual formation of the cord fabric, i.e. at some point after initial formation of the polyester filament, thread or yarn but before such filaments have been woven or fabricated into the completed cord fabric. The filaments, threads or yarns are so stiff or inflexible as to completely preclude subsequent steps of thread transfer, winding, spooling, weaving and the like where flexibility is essential. Thus, the agents previously employed must be applied to the completed cord fabric and not before.

One object of the present invention is to provide a method of pretreating polyethylene terephthalate filaments, fibers, threads, yarns, cords, fabrics, webs or the like for the improvement of rubber adhesion, especially in the production of polyethylene terephthalate tire cord and similar applications.

Another object of the invention is to provide a filamentary polyethylene terephthalate product to which there has been applied a novel base coating over which there can be applied a second coating of a resorcinol-formaldehyde/vinyl pyridine latex treating agent having a known effect in improving the rubber adhesion properties of synthetic fibers.

Still another object of the invention is to provide an improved method of pretreating polyethylene terephthalate filaments for subsequent rubber adhesion, whereby it is possible to use an easily prepared aqueous treating bath and the filaments can be pretreated at practically any point before or after being woven or fabricated into tire cord or similar rubber reinforcing structures.

Yet another object of the invention is to improve the rubber adhesion of polyethylene terephtralate filaments by a method which is easily and inexpensively carried out with conventional textile apparatus and in combination with conventional textile processing steps.

These and other objects and advantages of the invention will become more apparent upon consideration of the following detailed specification, it being understood that various modifications of known procedures and materials can be made without departing from the spirit or scope of this invention.

It has now been found in accordance with the present invention, that the rubber adhesion properties of polyethylene terephthalate filaments can be substantially improved by a process which includes the steps of applying to the filaments an aqueous dispersion of (A) the polyglycidic ether of a cyclic hydrocarbon substituted by at least two hydroxy groups and (B) an amine, and then heating the pretreated filaments to a temperature sufficient to fix the ether and amine components onto the filament, in a range of approximately 100° C. up to a temperature at which the filaments are capable of being exposed for very short periods of time without being damaged, preferably at a temperature of about 160° C. to 245° C. The period of time required for the heat treatment is dependent on the temperature, longer periods being necessary at lower temperatures. It is especially advantageous to carry out the heat treatment step for periods of about 2 to 120 seconds at temperatures between 160° C. and 220° C.

These pretreatment steps can be carried out at any time after the initial extrusion or spinning of the polyethylene terephthalate filaments and before or after the filaments have been formed into threads, yarns, cords, fabrics or the like by conventional means. In this manner, a heat-fixed or cured base coating of the polyglcidic ether and amine components is applied to the filamentary material, and thereafter a second coating can be applied in the usual manner by using the known resorcinol-formaldehyde-latex bonding agent, preferably by applying to the cord fabric or other reinforcing filamentary product containing the base coating of the invention an aqueous dispersion of a partially condensed resorcinol-formaldehyde resin and a vinyl pyridine latex. The overall two-stage coating process yields a polyethylene terephthalate filamentary product with highly improved properties of rubber adhesion.

The polyglycidic ether component of the base coating is preferably a polyglycidic ether of an aromatic or cycloaliphatic hydrocarbon containing up to 10 carbon atoms and substituted by two, three or more hydroxy groups. These polyglycidic ethers may be represented by the structural formula

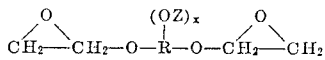

wherein R represents the aromatic or cycloaliphatic hydrocarbon, Z is hydrogen or the glycidic radical, and $x$ is a small whole integer, preferably an integer of from 0 to 2, inclusive. It is especially advantageous to employ those ethers which are soluble in alcohol and alcohol-water mixtures, although it is feasible to employ such ethers as are capable of being emulsified or dispersed in water alone by means of a suitable surface active agent. The ether component is then readily dispersed in an aqueous bath, either as an aqueous-alcoholic solution or as an aqueous emulsion. Useful ethers thus include: the polyglycidic ethers of benzene-diols and triols such as resorcinol, catechol, hydroquinol, pyrogallol, phyoroglucinol, and 1,2,4-benzenetriol; the polyglycidic ethers of naphthalene-diols; and the polyglycidic ethers of cycloaliphatic polyols such as the cyclohexane-diols, quercitol, pinite and inositol. These compounds in which the "glycidic" radical has the formula

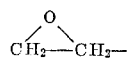

can be prepared in conventional manner by reacting the aromatic or cycloaliphatic polyols with epichlorhydrin. Mixtures of various ethers can also be employed.

It will be recognized that the polyglycidic ethers are quite reactive when subjected to an elevated temperature in the presence of a relatively small amount of an amine, and it is therefore possible to heat cure these materials to form a strongly adherent coating on the polyethylene terephthalate filaments. In addition, the cured product is apparently further capable of reacting or at least having strongly adherent properties for the more conventional bonding agents, especially resorcinol-formaldehyde-latex mixtures, thereby permitting the production of a two-layer filamentary product which has better rubber adhesion properties than when using the known bonding agents alone.

The amine component of the base coating probably acts as a curing agent, catalyst or accelerator for the glycidic or epoxy groups of the ether to form a cross-linked product of indeterminate structure. In general, those amines are useful which are commonly employed in the curing of epoxy resins, and it is especially desirable to employ water-soluble or alcohol-soluble amines so that both components can be applied from an easily prepared and stable aqueous-alcoholic solution. However, it is feasible to employ amines which are emulsifiable or capable of being dispersed with a suitable non-ionogenic surface active agent. More particularly, the preferred amines are aliphatic or heterocyclic amines consisting solely of carbon, hydrogen and nitrogen atoms, the nitrogen atoms being attached to a hydrocarbon structure of from 1 to 10 carbon atoms, preferably about 2 to 6 carbon atoms. By way of example, the following amines are especially advantageous: piperazine, dimethyl-piperazine, piperidine, pyridine, hexamethylene diamine, di-isopropylamine and guanidine. Other amines generally include derivatives of guanidine such as N-lower alkyl guanidines and dicyandiamide, the various polyalkylene polyamines, polyalkylene imines and polyimines as well as the simpler alkylamines.

As compared to previously known two-stage processes, the first stage or pretreatment step of the present invention offers a number of advantages which were quite unpredictable. For example, the aqueous-alcoholic solution or aqueous emulsion contains a curable mixture which can consist essentially of only the two required components, i.e. the polyglycidic ether and the amine, and the concentration is not critical. In general, the polyglycidic ether can be dispersed in the aqueous-alcoholic solution or the aqueous emulsion in amounts as low as about 0.1% by weight up to practically any amount which can be readily dissolved or otherwise dispersed in the aqueous medium. It is most practical to use an aqueous-alcoholic solution or an aqueous emulsion of about 1 to 10% by weight of the ether component. The amine should ordinarily be employed in amounts of about 5 to 100 molar percent with reference to the polyglycidic ether. Within these preferred limits, good results are assured.

With reference to the heat cured polyethylene terephthalate filamentary material, an application of even less than 0.1% by weight of the polyglycidic ether is sufficient to provide a base coating having a satisfactory rubber adhesion after applying the overcoating of a precondensed resorcinol-formaldehyde and vinyl pyridine latex bonding agent. The upper limit of the applied polyglycidic ether coating depends on economical considerations rather than any functional criticality. In general, the precoated filamentary material may contain at least 0.05% up to about 5% by weight of the polyglycidic ether, and the most favorable results are achieved in a range of approximately 0.1 to 2% by weight. The amine component on the cured filamentary material is again present in approximately the same proportion as in the aqueous treating medium, i.e. about 5 to 100 molar percent with reference to the polyglycidic ether.

The present invention also permits the use of polyglycidic ethers and amines which are alcohol-soluble whereas previous coating or bonding agents have been used only as aqueous emulsions in the most favorable applications. This means that very stable aqueous-alcoholic treating baths or easily applied solutions can be prepared without the addition of other components, and it is unnecessary to use wetting or emulsifying agents either to disperse the curable bonding components or to obtain an effective impregnation or coating of the filamentary material. In using an alcohol as a solvent and dispersing agent for the ether and/or amine components so as to provide an aqueous-alcoholic solution as the treaating bath, it is preferable to employ inexpensive and readily available alcohols, e.g. the lower alkanols having up to about 6 carbon atoms, such as methanol, propanols or butanols. The ratio of water to alcohol can be widely varied, depending on solubility characteristics, and is preferably about 4:1 to 1:4.

On the other hand, the polyglycidic ethers and amines are compatible with both water-soluble and oil-soluble nonionogenic surface active agents having emulsifying properties, and in certain applications, it is possible to use the polyglycidic ethers and amines together with such emulsifiers. For example, the polyglycidic ether-amine mixture can be applied substantially simultaneously with known spinning preparations, i.e. lubricating agents for synthetic fibers, as are normally employed in providing a smooth, freely running filament, thread or yarn in various textile operations. These lubricating agents are aqueous emulsions of natural fats or oils with a non-ionogenic emulsifier such as ethoxylated-fatty acid esters, -sorbitol esters or -sorbitanes. Lubricating agents or spinning preparations of a hydrocarbon solvent such as benzine, i.e. paraffins or saturated aliphatic hydrocarbons in the boiling point range of gasoline, which contains free fatty acids can also be used where miscible with the aqueous-alcoholic preparation of the present invention. The spinning preparations may also contain small amounts of an antielectrostatic agent, and in general, other variations of such preparations can be tolerated provided that a water-miscible or water-dispersed composition is achieved with very small amounts or preferably no ionic components.

A further advantage of the present invention resides in the fact that the heating of the filaments pretreated with the polyglycidic ether and amine composition can be accomplished over a wide range of temperatures and treatment times. Even at a relatively low temperature of about 160° C., heating can be carried out with hot air or steam for brief staying times in the treatment chamber. On the other hand, temperatures as high as 245° C. can also be used without difficulty. The treatment time should usually be at least about one second up to about five and one-half minutes, preferably about 2 to 120 seconds at temperatures of between about 160° C. and 220° C. It is therefore possible to combine the pretreating steps of the invention at almost any point in the overall process from the production of the initial polyethylene-terephthalate filaments to the completed cord yarn or cord fabric, without any delay in the usually rapid transfer of thread or yarn during and between the essential textile operations.

As pointed out above, known bonding agents for synthetic filaments or yarns cause these textile materials to become stiff and relatively inflexible. By contrast, a most important advantage of the present invention is that the precoated polyethylene terephthalate filaments remain quite supple and flexible even after being heat-fixed or cured. Therefore, the individual filaments or threads or yarns can receive an application of the base coating according to the invention without first being formed into the cord fabric. For example, in a preferred combination of the invention, the base coating can be applied and cured immediately after the polyethylene terephthalate filaments have been extruded from the spinning melt and stretched for fiber orientation. At this point, the stretched filaments are normally conducted in a conventional manner through a heating chamber in which they are subjected to a slight shrinkage or heat-setting by means of superheated steam or hot air. Before entering this heating chamber, the filaments can be moistened on a godet with the aqueous-alcoholic treating solution of the invention.

The temperature of about 245° C. normally used in the heat-setting step is then sufficient to provide the proper shrinkage of the filaments and is at the same time sufficient to heat-fix the base coating of the invention. Thereafter, the filaments are also smooth and flexible and the subsequent textile operations and the cording process can be carried out without any difficulty.

Of course, the aqueous formulation of the polyglycidic ether and amine can also be applied and heat-fixed at other points in the overall textile operations, and may be applied as with previous coatings after the cording of the yarn or after the cord fabric has been manufactured. In all cases, the resulting filaments with the base coating of the invention serves as an intermediate product which can be further treated in order to obtain excellent rubber adhesion properties.

The best resorcinol-formaldehyde-latex bonding agents are those which contain a vinyl pyridine latex, and these compositions are naturally preferred for the purpose of a second coating or layer applied over the base coating or layer of the invention. The formulation and use of RFL dispersions in water are disclosed in numerous patents and other references, including the following: U.S. Patent No. 2,128,229; U.S. Patent No. 2,561,215; U.S. Patent No. 2,746,898; C. E. Coke, "The 'Fiber Bonded' Process," Textile Recorder, 66, pp. 61–64 (1949); L. W. Reeves, "The Problem of Adhesion," Rubber World, 132, pp. 764–765 (1955); M. I. Dietrick, "Resorcinol-Formaldehyde Latex Adhesives for Bonding Synthetic Tire Cords," Rubber World, 196, pp. 847–851 (1957); G. M. Doyle, "Aspects of Rubber-Textile Adhesion," Trans. Int. Rubber Ind., 36, pp. 177–194 (1960); and M. W. Wilson, "Tire Fabric Adhesion and RFL," Adhesive Age, 4, No. 4, pp. 32–36 (1963). While these references are primarily concerned with the application of RFL dispersions to nylon or rayon, the same compositions and procedures are followed in applying the second coating to polyethylene terephthalate filaments in the overall method of the present invention.

The second coating step of the present invention, while generally known, is preferably a correctly prepared aqueous emulsion of the partially condensed resorcinol-formaldehyde resin and a latex consisting essentially of vinyl pyridine in combination with a natural or snythetic latex. The particular latex is often selected so as to have about the same composition as the rubber or latex for which good adherence is desired. In many cases, very effective results are achieved with the known latices which are terpolymers of vinyl pyridine, butadiene and styrene. Some natural latex may also be incorporated with the synthetic latex. The application and curing of these RFL bonding agents are relatively complex and carefully controlled procedures which are generally applicable regardless of the composition of the particular filamentary material being treated. Reference is therefore made to voluminous disclosures which have been made in this field since these refinements fall outside the scope of the present invention.

Similarly, the actual bonding of the tire cord or similar reinforcing article to the rubber in the final product and various methods of testing the rubber adhesion properties are well known in this art and do not require any elaboration. These and other conventional procedures and materials can generally be used in combination with the particular method and base coated filamentary product of the present invention, and in fact, the particular treatment described and claimed herein is especially advantageous because of its excellent adaptability and flexibility of use within the known limitations of this art.

The following examples further illustrate the present invention without restricting the invention to the specific details actually shown. Parts and percentages are by weight unless otherwise indicated.

EXAMPLE I

Cord yarn of polyethylene terephthalate of 1000 denier 2 x, with 500 Z and 500 S turns per meter, is treated with an aqueous-alcoholic solution or aqueous emulsion of the ether and amine components according to the invention, the composition of this base coating agent being given for each test in Table I. After coating the filaments with these components, there follows a first stage heat treatment according to the table.

The base coated cord yarn structure obtained in this manner is subjected to further treatment in a second stage with a known aqueous dispersion in the form of an RFL preparation which contains about 5% resorcinol-formaldehyde precondensate and about 40% vinylpyridine latex and is prepared as follows: 18.9 parts by weight or resorcinol, 27.8 parts by weight of formaldehyde (35%) and 0.5 part by weight of NaOH (solid) are absorbed in 409.8 parts by weight of water and precondensed for four hours under agitation at 20° C., and then mixed with 524.3 parts by weight of a 33% vinylpyridine latex and finally treated with 18.7 parts by weight of an aqueous ammoniac solution (30%). The finished emulsion should be used up after three days. After applying the RFL preparation to the cord yarn, it is subjected to heat treatment in a second stage where the temperature and retention time fall within conventional procedures. The resulting cord yarn is thus surface treated with a base coat according to the present invention followed by an RFL overcoating and can then be tested to determine its capacity for rubber adhesion.

*Table I*

| Composition of the solution or emulsion | Retention time, seconds | | Temp., °C. | | Cord Strength, kg. | | Rubber Adhesion, kg.[1] |
|---|---|---|---|---|---|---|---|
| | 1st stage | 2d stage | 1st stage | 2d stage | Before treatment | After treatment | |
| 15 parts phloroglucinol triglycidic ether, 1.5 parts hexamethylenediamine, 125 parts isopropyl alcohol, 125 parts water | 120 | 40 | 200 | 210 | 12.4 | 12.2 | 12.2 |
| 10 parts pyrogallol triglycidic ether, 3 parts piperazine hydrate (6 H₂O), 20 parts emulsifier A,[2] 250 parts water | 100 | 40 | 200 | 200 | 12.4 | 12.1 | 11.8 |
| 10 parts resorcinol diglycidic ether, 2 parts trans-2,5-dimethyl piperazine, 125 parts isopropyl alcohol, 125 parts water | 120 | 20 | 200 | 200 | 12.4 | 12.3 | 12.0 |

[1] For the determination of the rubber adhesion the pretreated cord is vulcanized at 150° for 25 minutes into a carcass mixture in such a manner that the adhesion length amounts to exactly 1 cm. The force is measured which must be applied in order to pull the cord out of the rubber piece.
[2] Emulsifier A—ethoxylated sorbitol ester.

EXAMPLE II

Table II gives some additional examples in which the treatment in the first stage takes place at an earlier point of time. Yarn with a denier of 1000 (210 individual filaments) is stretched at 220° C. in the ratio of 1:6 and then conducted through a steam chamber at 245° C. where a shrinkage occurs in a ratio of 1:0.9. The yarn leaves the steam chamber after a staying time of 3.5 seconds. Between the stretching and relaxing or shrinkage zone, there is arranged a godet over which the thread or yarn is conducted. The godet is immersed into the aqueous treating fluid or bath, the composition of which is set forth in column 1 of the table. The application of this preliminary treating agent to the yarn in this manner provides a base coating of the polyglycidic ether in an amount of about 0.2%. The retention time of 3.5 seconds in the steam chamber is sufficient for fixing the preliminary treating agent on the yarn. Longer retention times of 120 seconds and more at 210° C. are likewise suitable. The base coated yarn is then corded into a structure corresponding to the cord yarn employed in both stages of Table I. This cord yarn is then overcoated with the RFL emulsion and subjected to the second stage heat treatment in the same manner as Example I.

*Table II*

| Composition of the solution or emulsion | Retention time, seconds | | Temperature, °C. | | Cord Strength, kg. | Rubber Adhesion, kg.[1] |
|---|---|---|---|---|---|---|
| | Shrinkage zone | 2d Stage | Shrinkage zone | 2d Stage | | |
| 15 parts phloroglucinol triglycidic ether, 1.5 parts hexamethylenediamine, 125 parts isopropyl alcohol, 125 parts water | 3.5 | 40 | 245 | 200 | 12.5 | 12.3 |
| 10 parts pyrogallol triglycidic ether, 3 parts piperazine hydrate (6 H₂O), 20 parts emulsifier, A,[2] 250 parts water | 3.5 | 40 | 245 | 210 | 12.4 | 12.0 |
| 10 parts resorcinol diglycidic ether, 2 parts trans-2,5-dimethyl piperazine, 125 parts isopropyl alcohol, 125 parts water | 3.5 | 40 | 245 | 200 | 12.4 | 12.4 |

[1] For the determination of the rubber adhesion the pretreated cord is vulcanized at 150° for 25 minutes into a carcass mixture in such a manner that the adhesion length amounts to exactly 1 cm. The force is measured which must be applied in order to pull the cord out of the rubber piece.
[2] Emulsifier A—ethoxylated sorbitol ester.

EXAMPLE III

Spun or extruded filaments of polyethylene terephthalate are conducted in the same manner as Example II through the stretching and shingage steps. However, the base coating agent is applied after spinning and before steretching by leading the filaments over a godet where they are wetted or impregnated with an aqueous-alcoholic solution or aqueous emulsion according to the invention, the composition of which is shown in Column 1 of Table III. The necessary heat treatment is then provided during the subsequent stretching process and/or shrinkage process. The base precoated yarn thus obtained is then corded into the same structure and subjected to the same RFL coating in a second stage as employed in the previous examples.

Table III

| Composition of the solution or emulsion | Retention time-seconds | | | Temperature, ° C. | | | Cord Strength, kg. | Rubber Adhesion, kg.[1] |
|---|---|---|---|---|---|---|---|---|
| | Stretching zone | Shrinkage zone | 2d Stage | Stretching zone | Shrinkage zone | 2d Stage | | |
| 15 parts phloroglucinol triglycidic ether, 1.5 parts hexamethylenediamine, 125 parts isopropyl alcohol, 125 parts water | 4.5 | 4.5 | 40 | 220 | 235 | 200 | 12.2 | 12.2 |
| 10 parts pyrogallol triglycidic ether, 3 parts piperazine hydrate (6 H$_2$O), 20 parts emulsifier A,[2] 250 parts water | 3.5 | 3.5 | 40 | 225 | 245 | 200 | 12.5 | 12.1 |
| 10 parts resorcinol diglycidic ether, 2 parts trans-2,5-dimethyl piperazine, 125 parts isopropyl alcohol, 125 parts water | 3.5 | | 40 | 225 | | 200 | 12.7 | 12.5 |

[1] For the determination of the rubber adhesion the pretreated cord is vulcanized at 150° for 25 minutes into a carcass mixture in such a manner that the adhesion length amounts to exactly 1 cm. The force is measured which must be applied in order to pull the cord out of the rubber piece.

[2] Emulsifier A—ethoxylated sorbitol ester.

The process of this invention can be further modified in an advantageous manner by applying the bonding composition or pretreating agent, i.e. the polyglycidic ether and amine components, at substantially the same time together with a spinning preparation which contains a lubricating agent dispersed in water or benzine, a non-inoic emulsifying agent being used in order to achieve proper dispersion or emulsification of the insoluble ingredients. The base coat of the new bonding composition is then heat-fixed in the presence of the spinning preparation and serves as an intermediate adherent layer for subsequent application of the resorcinol-formaldehyde-latex bonding agent. This procedure essentially avoids a completely separate step in the overall process by permitting a substantially concurrent or simultaneous application of both the lubricating agent and the base coat composition.

During the mechanical transport and handling of the yarn or filaments between application of the bonding layers, the lubricating agent functions in its usual manner to facilitate yarn winding, spooling, transport, weaving, cording and the like. The usual lubricating agents such as natural fats and oils, e.g. vegetable oils or the so-called "wool oils" can be employed either in water or benzine as a diluent. An aqueous spinning preparation requires a non-ionic emulsifying agent to disperse such lubricating agents as vegetable oils, glycerides, esters of higher fatty acids, or the like. Typical benzine spinning preparations are paraffin oils, i.e. saturated aliphatic hydrocarbons boiling in the gasoline range, containing free fatty acids. The non-ionic emulsifying agents are preferably polyethoxylated higher fatty acids, fatty acid esters or fatty alcohols or one of the known polyethoxylated sorbitol esters or sorbitans. The spinning preparation may also contain other additives such as anti-static agents in addition to one or more lubricating agents. These agents and the manner in which they are applied as a spinning preparation are described in even greater detail in our copending application, Serial No. 338,719, filed January 20, 1964, and pertinent disclosure of the copending application is therefore incorporated by reference herein as fully as if set forth in its entirety. For example, the aqueous or benzine spinning preparation can be mixed with the aqueous-alcoholic solution or aqueous emulsion containing the polyglycidic ether and amine components, and this mixture is then applied to the filaments by means of a godet which is normally used for the application of spinning preparations. However, it is also possible to arrange two godets, one under the other, and to apply the spinning separation and the intermediate bonding composition separately but in immediate succession. A non-ionic emulsifying agent is preferably empolyed to ensure uniform application to the filaments.

While it can be readily seen that the spinning preparations and the water-containing intermediate bonding agents are compatible with each other in terms of water-miscibility and dispersability of the individual components, it is quite surprising that lubricating agents and the bonding agents function equally well even though combined in their application to the filaments. The overall process can thus be simplified without losing the advantages of either agent, and the filaments remain smooth and supple or pliable even after heat curing the bonding agent.

The simultaneous application of the lubricating agent and intermediate bonding composition is illustrated in the following example:

EXAMPLE IV

Polyethylene terephthalate filaments are melt spun through a suitable spinning nozzle and conducted as a non-woven yarn (1000 denier/210 individual filaments) over a godet where the filaments are moistened with a spinning preparation as shown in column I of Table IV containing the bonding composition of column 2 in admixture therewith. The impregnated yarn coated with this combination of lubricating and bonding agents is then collected on a spool employed as the take-off spool in a

TABLE IV

| Spinning preparation | 1st Stage bonding composition | After-impregnation with vinyl pyridine latex | | Cord Strength, kg. | Rubber Adhesion, kg.[1] |
|---|---|---|---|---|---|
| | | Temp., ° C. | Retention time, seconds | | |
| 800 parts water, 100 parts butyl stearate, 65 parts Emulsifier A.[1] | 25 parts pyrogalloltriglycide ether, 10 parts trans-2,5-dimethyl piperazine. | 200 | 40 | 12.3 | 12.0 |
| 780 parts water, 80 parts butyl stearate, 30 parts palm kernel oil, 60 parts Emulsifier A,[2] 20 parts Emulsifier B.[3] | 24 parts resorcinol-diglycide ether, 6 parts hexamethylene diamine. | 210 | 20 | 12.2 | 11.6 |
| 790 parts water, 75 parts butylstearate, 30 parts palm kernel oil, 60 parts Emulsifier A,[2] 15 parts Emulsifier B.[3] | 22 parts phloroglucinol triglycide ether, 8 parts piperazine hydrate (6 H$_2$O). | 210 | 40 | 12.6 | 12.1 |

[1] For the determination of rubber adhesion, the pretreated cord is vulcanized at 150° C. for 25 minutes into a carcass mixture in such a manner that the adhesion length amounts to exactly 1 cm. The force is measured which must be applied in order to pull the cord out of the rubber piece.

[2] Emulsifier A—ethoxylated sorbitol ester.

[3] Emulsifier B—ethoxylated oleic or ricinoleic acid or ethoxylated castor oil.

stretching operation where the filaments are heated and stretched for fiber orientation in the usual manner. This stretching is carried out at a temperature of about 225° C. Thereafter, the filaments are heat-set for slight shrinkage by passage through a steam zone at 245° C. The retention time in each of these heating steps corresponds to that employed in the previous examples, and these steps represent the first stage of the overall bonding procedure. At this point, the filaments are lubricated and the intermediate bonding composition is heat-fixed or cured. Two groups of such filaments, as collected on storage spools or bobbins, are then twisted into a cord yarn of 1000 denier 2X, 500S/500Z, and this cord yarn is then conducted in conventional manner through a vat or vessel containing the same RFL bonding agent as in the preceding examples. After being coated with this aqueous dispersion of a resorcinol-formaldehyde precondensate and vinyl pyridine latex, curing is accomplished in a short period of time and at temperatures of about 160°–230° C. in a second stage heating zone (see columns 3 and 4 of Table IV). The cord strength after application of both bonding layers is shown in column 5 of the table, and the rubber adhesion is shown in the last column of the table.

The invention is hereby claimed as follows:

1. An improved process for pretreating a non-woven polyethylene terephthalate yarn for subsequent rubber adhesion, which process comprises: applying substantially concurrently as a base coating onto said nonwoven yarn an aqueous dispersion of (A) the curable combination of a polyglycidic ether of a cyclic hydrocarbon substituted by at least two hydroxy groups and an amine curing agent, and
(B) a lubricating agent which is adapted to lubricate the filaments in said non-woven yarn during subsequent transport and handling; and then heating the base coated yarn to a temperature of about 160° C. to 245° C. for a period of time sufficient to fix the ether and amine components thereto.

2. A process as claimed in claim 1 wherein Components (A) and (B) are dispersed in water by means of an emulsifying agent.

3. A process as claimed in claim 2 wherein said emulsifying agent is a non-ionic surface active organic compound.

References Cited by the Examiner

UNITED STATES PATENTS

| | | | |
|---|---|---|---|
| 2,829,071 | 2/1958 | Schroeder | 117—135.5 |
| 2,902,398 | 9/1959 | Schroeder | 161—184 |
| 3,036,948 | 5/1962 | Danielson | 161—184 |
| 3,222,238 | 12/1965 | Krysiak | 161—184 |
| 3,231,412 | 1/1966 | Pruitt et al. | 117—76 |

ALFRED L. LEAVITT, *Primary Examiner.*

A. H. ROSENSTEIN, *Assistant Examiner.*